United States Patent
Suzuki et al.

(10) Patent No.: US 6,687,580 B2
(45) Date of Patent: Feb. 3, 2004

(54) VEHICLE CONTROLLER AND VEHICLE CONTROL METHOD

(75) Inventors: Naoto Suzuki, Fujinomiya (JP); Toshifumi Takaoka, Susono (JP); Takashi Suzuki, Susono (JP); Makoto Yamazaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/916,688

(22) Filed: Jul. 30, 2001

(65) Prior Publication Data

US 2002/0019687 A1 Feb. 14, 2002

(30) Foreign Application Priority Data

Aug. 3, 2000 (JP) ........................................ 2000-236220

(51) Int. Cl.$^7$ ................................ H02P 1/00; H02P 3/00
(52) U.S. Cl. ........................... 701/22; 701/86; 701/110; 318/139; 318/143; 318/157; 123/179.1; 290/28; 290/36 R; 477/7
(58) Field of Search .............................. 701/22, 36, 99, 701/102, 86, 110; 290/40 C, 40 R, 28, 36 R; 477/107, 111, 7; 318/139, 143, 146, 157; 123/179.1

(56) References Cited

U.S. PATENT DOCUMENTS

| | | | | |
|---|---|---|---|---|
| 6,253,127 B1 | * | 6/2001 | Itoyama et al. | 701/22 |
| 6,335,573 B1 | * | 1/2002 | Eguchi et al. | 290/40 C |
| 6,373,206 B1 | * | 4/2002 | Morimoto et al. | 318/139 |
| 6,422,972 B1 | * | 7/2002 | Eguchi | 477/107 |
| 6,430,482 B1 | * | 8/2002 | Wakashiro et al. | 701/22 |
| 6,434,453 B1 | * | 8/2002 | Kuroda et al. | 701/22 |
| 2002/0065589 A1 | * | 5/2002 | Ostberg et al. | 701/22 |

FOREIGN PATENT DOCUMENTS

| | | |
|---|---|---|
| JP | B2 62-31175 | 7/1987 |
| JP | A 9-58295 | 3/1997 |
| JP | A 9-74607 | 3/1997 |
| JP | A 9-209790 | 8/1997 |
| JP | A 11-343893 | 12/1999 |
| JP | A 2000-55186 | 2/2000 |
| JP | A 2000-145946 | 5/2000 |

* cited by examiner

Primary Examiner—William A Cuchlinski, Jr.
Assistant Examiner—Tuan C To
(74) Attorney, Agent, or Firm—Oliff & Berridge, PLC

(57) ABSTRACT

A vehicle controller includes a plurality of driving power sources for transmitting torque to a wheel, and a starter for starting a first driving power source of the plurality of diving power sources. The first driving power source is stopped when a prescribed stopping condition is satisfied, and the stopped first driving power source is started by the starter when a prescribed restarting condition is satisfied. When the startability of the first driving power source has been degraded, stopping of the first driving power source is inhibited even when the prescribed stopping condition is satisfied.

17 Claims, 3 Drawing Sheets

VEHICLE CONTROLLER AND VEHICLE CONTROL METHOD

INCORPORATION BY REFERENCE

The disclosure of Japanese Patent Application No. 2000-236220 filed on Aug. 3, 2000 including the specification, drawings and abstract is incorporated herein by reference in its entirety.

BACKGROUND OF THE INVENTION

1. Field of Invention

The invention relates to a vehicle controller having a plurality of driving power sources and a starter for starting a specific one of the plurality of driving power sources, and is capable of stopping and starting a specific driving power source based on the prescribed conditions, and a vehicle control method.

2. Description of Related Art

Conventionally, a hybrid vehicle is provided with an engine and a motor generator as driving power sources. In this hybrid vehicle, when the engine torque is not enough with respect to the required driving power, the motor generator is operated as an electric motor to provide the additional torque for the required driving power. On the other hand, when excessive engine torque is generated with respect to the required driving power, the motor generator is operated as a generator to convert the excessive engine torque into electric energy for recovery. Thus, the operating state of the engine can be controlled to achieve excellent fuel efficiency, regardless of the variation in the required driving power.

Japanese Patent Laid-Open Publication No. HEI 9-209790 describes an example of an engine stopping controller of a hybrid vehicle including an engine and a motor generator as driving power sources. The hybrid vehicle described in this publication includes a motor generator, clutch, transmission and differential gear in a power transmission path from the engine to the wheels. If all of the following conditions, i.e., automatic stopping conditions, are satisfied while the vehicle is stopped, the engine is automatically stopped: prescribed time has passed since the vehicle was stopped; the brake is ON; and a battery for supplying electric power to the motor generator has a prescribed charging amount or more. If at least one of the following conditions, i.e., automatic starting conditions, is satisfied while the engine is in the automatically stopped state, the engine is restarted: the brake has been released or the charging amount of the battery has been reduced below the prescribed value.

The motor generator is a rotating machine functioning as a generator or electric motor, and the rotor thereof is coupled to the crankshaft of the engine. Therefore, the following controls are possible: the motor generator is driven with the engine power to generate electric power; and, during coasting of the vehicle, the motor generator is driven with the power of the wheels to generate electric power (regenerative braking control). The following controls are also possible: using the power supplied from the battery, the motor generator is driven as an electric motor to transmit the resultant torque to the wheels; and the engine is started by the motor generator.

Provided that the automatic stopping conditions are satisfied, the engine stopping controller of the aforementioned publication may automatically stop the engine even if the restartability of the engine has been degraded. In this case, the engine may not be able to be restarted, thereby making driving of the vehicle impossible.

SUMMARY OF THE INVENTION

The invention is made in view of the aforementioned problems. The invention thus provides a vehicle controller and a vehicle control method capable of preventing the inability to restart a driving power source from being induced.

To achieve the foregoing, a vehicle controller according to a first exemplary aspect of the invention controls a vehicle that includes a plurality of driving power sources for transmitting torque to a wheel, and a starter for starting a first driving power source of the plurality of driving power sources. The first driving power source is stopped when a prescribed stopping condition is satisfied, and the stopped first driving power source is started by the starter when a prescribed restarting condition is satisfied. It is also determined whether startability of the first driving power source by the starter has been degraded. When it is determined that the startability of the first driving power source has been degraded, stopping of the first driving power source is inhibited even when the prescribed stopping condition is satisfied.

According to the first exemplary aspect, when the startability of the first driving power source has been degraded, automatic stopping of the first driving power source is inhibited even when the prescribed stopping condition is satisfied. Accordingly, the inability to restart the first driving power source can be prevented from being induced.

When it is determined, while the first driving power source is stopped, that the startability of the first driving power source by the starter has been degraded, the first driving power source may be started by transmitting power of a driving power source other than the first driving power source to the first driving power source.

According to this structure, when the ability of the starter to start the first driving power source is degraded, while the first driving power source is stopped, the first driving power source is started with the power of the driving power source other than the first driving power source.

When it is determined that the startability of the first driving power source has been degraded due to degradation in the power-generation function of the starter, electric power consumption by the electric driving power source may be suppressed.

According to this structure, electric power consumption by the electric driving power source is suppressed when the startability of the first driving power source has been degraded due to degradation in the power-generation function of the starter. Accordingly, the deficiency of the electric power consumed to start the first driving power source can be avoided.

Moreover, when the startability of the first driving power source has been degraded due to degradation in the power-generation function of the starter, the power-generation function of a second driving power source of the plurality of driving power sources may be used to generate the electric power consumed to start the first driving power source. Thus, the electric power consumed to start the first driving power source can be supplemented.

The starter and the second driving power source may have a function to generate electric power consumed to start the first driving power source. When it is determined that the startability of the first driving power source has been degraded due to degradation in the power-generation function of the starter, the power-generation function of the second driving power source may be used to generate the electric power consumed to start the first driving power source.

According to this structure, a power-generating state of the second driving power source is controlled based on a charging state of the electric power consumed to start the first driving power source. Accordingly, the electric power consumed to start the first driving power source can be more reliably supplemented.

The exemplary aspects of the invention is not limited to the vehicle controller described above. For example, other exemplary aspects of the invention are directed to a vehicle including a vehicle controller, and a vehicle control method.

BRIEF DESCRIPTION OF THE DRAWINGS

The foregoing and/or further objects, features and advantages of the invention will become apparent from the following description of preferred embodiments with reference to the accompanying drawings, in which like numerals are used to represent like elements and wherein.

DETAILED DESCRIPTION OF PREFERRED EMBODIMENTS

Figure 2:
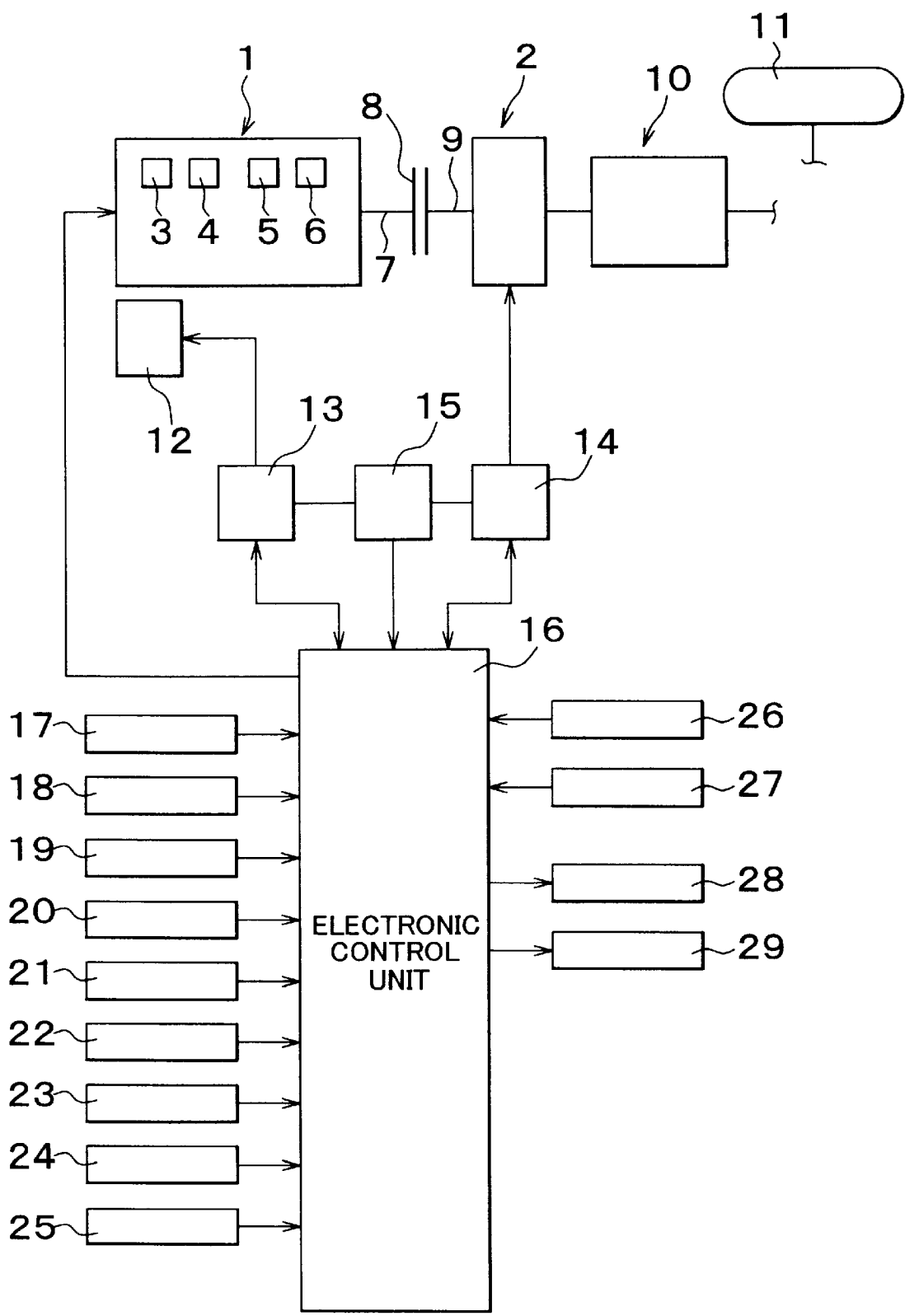
FIG. 2 is a diagram showing a power train and a control system thereof in a hybrid vehicle to which the invention is applied.

Hereinafter, embodiments of the invention will be described in connection with the accompanying drawings. FIG. 2 shows a power plant of a hybrid vehicle according to an embodiment of the invention. More specifically, an engine 1 and a motor generator 2 are provided as driving power sources of the vehicle. The engine 1 is an apparatus for outputting power generated by fuel combustion. An internal combustion engine, e.g., gasoline engine, diesel engine or LPG (liquefied petroleum gas) engine, can be employed as engine 1. For convenience, it is assumed in the present embodiment that a gasoline engine is used as engine 1. The engine 1 includes an igniter 3, a fuel injection system 4, a cooling system 5, an electronic throttle valve 6, and the like.

A power transmission shaft 9 is coupled to a crankshaft 7 of the engine 1 via a clutch 8. For example, a frictional clutch, hydraulic clutch or electromagnetic clutch may be used as clutch 8. When a hydraulic clutch is used as clutch 8, this clutch includes a torque converter having a function to amplify the toque transmitted from an input-side member to an output-side member, and a lock-up clutch that is engaged or disengaged to switch the power transmission state between the input-side member and output-side member.

The motor generator 2 functions both as an electric motor for receiving electric power and outputting torque, and a generator. For example, a stationary permanent magnet synchronous motor can be used as motor generator 2. A rotor (not shown) of the motor generator 2 is coupled to the power transmission shaft 9.

The power transmission shaft 9 is coupled to the input shaft side of a transmission 10 at the end opposite to the clutch 8. The transmission 10 is an automatic transmission capable of automatically controlling its gear ratio. The automatic transmission may either be a stepped transmission or a continuously variable transmission.

A motor generator 12 capable of transmitting power to the crankshaft 7 is also provided. The motor generator 12 functions both as an electric motor for receiving electric power and outputting power (i.e., torque), and a generator for converting mechanical energy into electric power. For example, a stationary permanent magnet synchronous motor can be used as the motor generator 12. A power transmission mechanism, e.g., a chain or belt, is provided in the power transmission path between the motor generator 12 and the crankshaft 7.

The motor generator 2 is primarily used as an electric motor, whereas the motor generator 12 is primarily used as a generator. Accordingly, the motor generators 2 and 12 have different ratings and characteristics (e.g., the number of turns of a coil). For example, according to a two-dimensional map (not shown) showing the relation between the torque and the revolution speed, the motor generators 2 and 12 have different characteristics when operated as an electric motor. More specifically, when the motor generators 2 and 12 are used as an electric motor, the torque of the motor generator 2 is higher than that of the motor generator 12 in a prescribed low revolution speed region.

Regarding the revolution speed capable of outputting the torque, the motor generator 12 is capable of outputting the torque up to a higher revolution speed region than the motor generator 2. It should be understood that, since the motor generators 2 and 12 have different characteristics regarding the relation between the revolution speed and the torque as described above, they have different power generation characteristics when operated as a generator.

A battery 15 is connected to the motor generators 2 and 12 through inverters 13 and 14, respectively. An electronic control unit (ECU) 16 is connected to the inverters 13, 14 and the battery 15. The igniter 3 and the fuel injection system 4 are also driven with the electric power of the battery 15. The ECU 16 is formed from a microcomputer including, as its main components, a central processing unit (CPU or MPU (Micro Processing Unit)), a storage device (RAM (Random Access Memory) and ROM (Read Only Memory)) and an input/output (I/O) interface. The ECU 16 receive signals from various components, including: a signal of an engine speed sensor 17; a signal of a cooling-water temperature sensor 18; a signal of an ignition switch 19; a signal of an intake air amount sensor 20; a signal indicating a state of charge (SOC) of the battery 15; a signal of an air-conditioning switch 21; a signal of a shift position sensor 22; a signal of a foot brake switch 23; a signal of an accelerator opening sensor 24; a signal of a throttle opening sensor 25; a signal of an input revolution speed sensor 26 of the transmission 10; and a signal of an output revolution speed sensor 27 of the transmission 10. The vehicle speed is calculated based on the signal of the output revolution speed sensor 27.

The ECU 16 outputs signals including: a signal for controlling the igniter 3; a signal for controlling the fuel injection system 4; a signal for controlling opening of the electronic throttle valve 6; a signal for controlling the motor generators 2 and 12 through the respective inverters 13 and 14; a signal to an actuator 28 for controlling engaging/disengaging of the clutch 8; and a signal to a hydraulic controller 29 for controlling the gear ratio of the transmission 10.

The structural correspondence between the present embodiment and the invention is as follows: the engine 1 and the motor generator 2 correspond to the driving power sources of the invention; the engine 1 corresponds to a first driving power source of the invention; the motor generators 2, 12, battery 15 and inverters 13, 14 correspond to a starter of the invention; and the motor generator 2 corresponds to a second driving power source of the invention.

In the hybrid vehicle having the aforementioned structure, the entire vehicle is controlled based on input signals to the ECU 16 and pre-stored data in the ECU 16. For example, the ignition switch 19 is capable of detecting each of the operation positions: LOCK (OFF), ACCESSORY, ON, and START. When the ignition switch 19 sequentially detects the ON and START positions, an engine start request is generated. In response to the engine start request, the motor generator 12 is driven, so that the power of the motor generator 12 causes initial revolution of the engine 1. Moreover, ignition control and fuel injection control are respectively conducted by the injector 3 and fuel injection system 4, so that the engine 1 revolves autonomously. When driving of auxiliaries, such as an air-conditioning compressor (not shown), are not required and the battery 15 has a prescribed charging amount or more, the engine 1 is automatically stopped after a prescribed time from starting of the engine 1.

During running of the vehicle, required engine output is calculated based on the vehicle speed and accelerator opening, and the engine speed is obtained from an optimal fuel efficiency line (not shown). Then, opening of the electronic throttle valve 6 is controlled to control the engine output, as well as the gear ratio of the transmission 10 to control the engine speed. In a low load region having poor engine efficiency, the engine 1 is stopped, and the vehicle runs with the torque of the motor generator 2.

Figure 3:
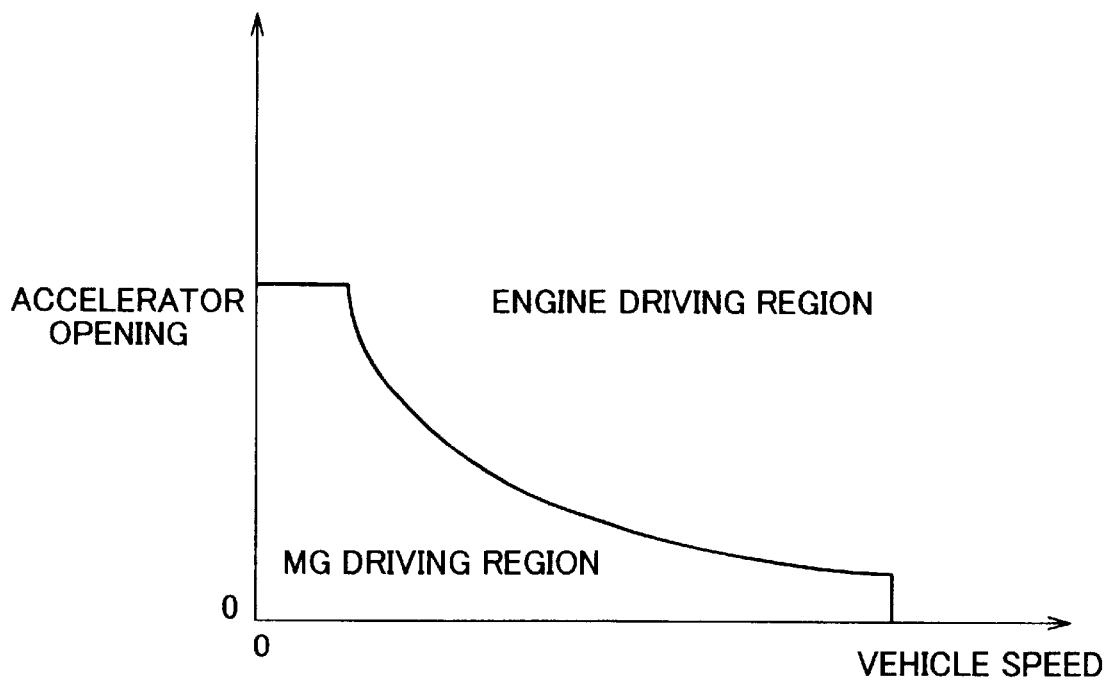
FIG. 3 is a diagram showing an exemplary map for controlling driving and stopping of an engine and motor generator in the hybrid vehicle of FIG. 2.

FIG. 3 shows an exemplary map in which an engine driving region and a motor-generator (MG) driving region are defined using the accelerator opening and vehicle speed as parameters. The engine driving region means that the engine toque is transmitted to the wheels 11, and the motor-generator driving region means that the torque of the motor generator 2 is transmitted to the wheels 11. In FIG. 3, the motor-generator driving region is defined to correspond to a relatively light load state (i.e., the state where the use of the engine 1 as a driving power source would degrade the fuel efficiency) as in starting of the vehicle. The engine driving region is defined to correspond to the running state during excellent engine efficiency.

When the vehicle speed and accelerator opening correspond to the motor-generator driving region, that is, when a prescribed stopping condition is satisfied, the engine 1 is automatically stopped regardless of the signal of the ignition switch 19. When the vehicle speed and accelerator opening are shifted to the engine driving region while the engine 1 is in the automatically stopped state, that is, when a prescribed restarting condition is satisfied, the engine 1 is started. Thus, a system for automatically stopping and restarting the engine 1 based on the map of FIG. 3 is referred to as an economy running system.

Basically, in FIG. 3, the engine 1 is independently driven in the engine driving region, whereas the motor generator 2 is independently driven in the motor-generator driving region. When the engine torque is not enough in the engine driving region with respect to the required driving power, the motor generator 2 is driven as an electric motor to make up for the engine torque. In the present embodiment, the engine 1 and motor generator 2 may be driven and stopped based on the conditions other than the map of FIG. 3. Such control will be described later.

If the charging amount of the battery 15 is not enough, the engine output is increased and the motor generator 12 is operated as a generator, so that the battery 15 can be charged with the resultant electric power. During deceleration (i.e., coasting) of the vehicle, the power of the wheels 11 is transmitted to the motor generator 2 and the motor generator 2 is operated as a generator to charge the battery 15 with the resultant electric power. Thus, regenerative braking force can be generated. In each of the above controls, the clutch 8 can be engaged to transmit the engine torque to the wheels 11, and the clutch 8 can be disengaged to independently drive the motor generator 2 and transmit its torque to the wheels 11.

During regenerative braking with the motor generator 2, the clutch 8 is disengaged so that the power-generating efficiency of the motor generator 2 can be improved. In the present embodiment, engaging the clutch 8 enables the engine 1 to be started with the power of the motor generator 2. In other words, the engine 1 can be started either with the motor generator 12 provided separately from the driving power source of the vehicle or the motor generator 2 serving as the driving power source of the vehicle.

Figure 1:
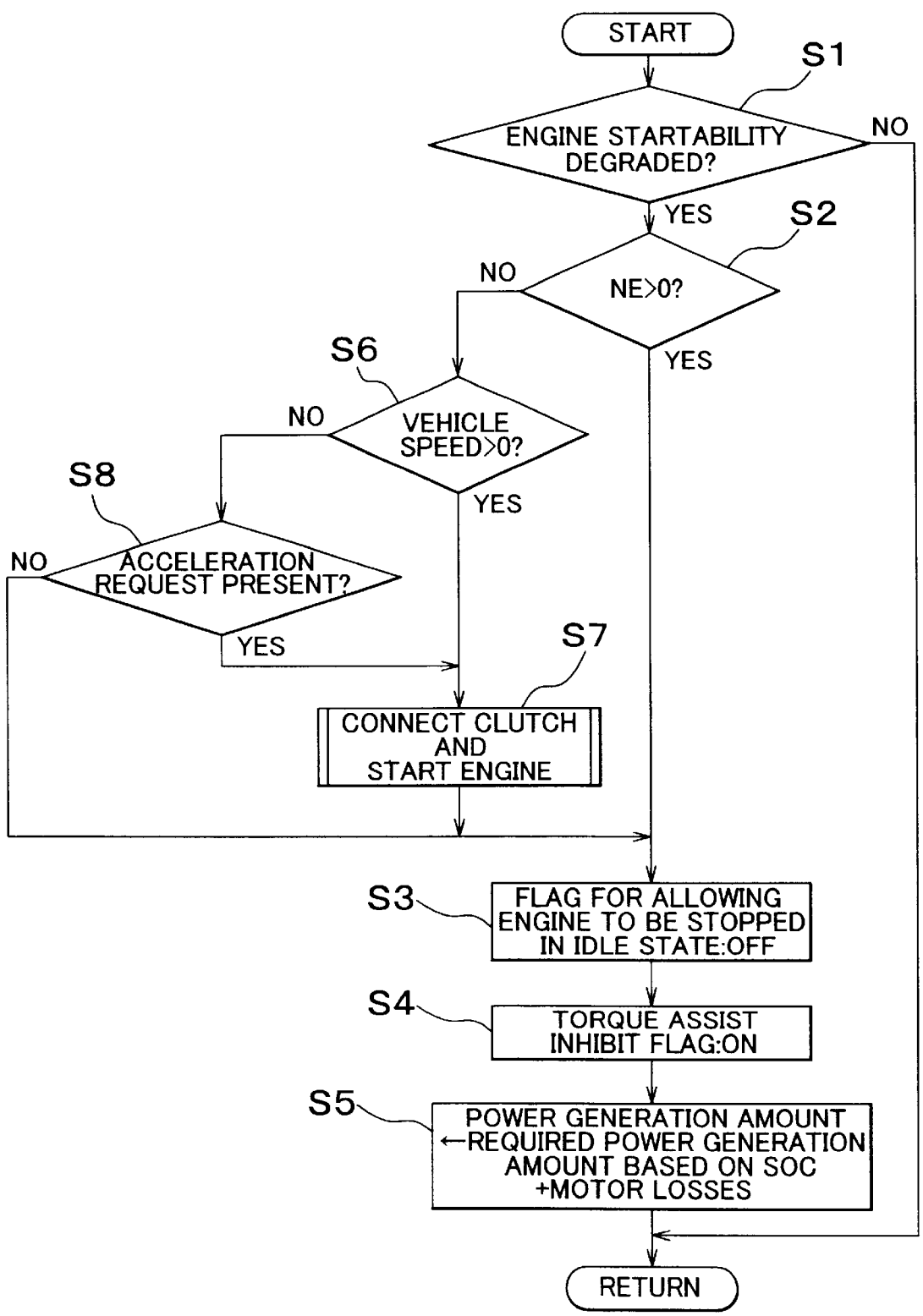
FIG. 1 is a flowchart illustrating an embodiment of a vehicle controller according to the invention.

Hereinafter, an example of starting and stopping the engine 1 based on the startability of the engine 1 will now be described in connection with the flowchart of FIG. 1. First, based on the input signal to the ECU 16, the ECU 16 determines whether the startability of the engine 1 has been degraded (step S1). The determination of step 1 is made based on whether the battery 15 has a prescribed charging amount or less, whether a system for starting the engine 1 has failed, and the like. If NO in step S1, the routine returns to start. In other words, the engine 1 is automatically stopped and restarted according to the aforementioned control.

If YES in step S1, it is determined whether the engine speed NE exceeds zero (step S2). If YES in step S2, the following problem may occur: once the engine 1 is automatically stopped based on the driving power source control map of FIG. 3, the engine 1 may no longer be able to be restarted even if the restarting conditions are satisfied. Therefore, the following control is conducted: first, a "flag for allowing the engine to be stopped in the idle state (i.e., in the state where the accelerator pedal is not stepped on)" is turned OFF (step S3). In other words, the economic running system is inhibited from automatically stopping the engine 1. Accordingly, the inability to restart the automatically stopped engine 1 and thus the inability to drive the vehicle can be prevented.

Then, a "flag for inhibiting the motor generator 2 from being used to make up for the engine torque that is not enough with respect to the required torque (torque assist inhibit flag)" is turned ON (step S4). Accordingly, even if the engine torque is not enough with respect to the required torque while the motor generator is driven or stopped according to the driving power source control map of FIG. 3, the motor generator 2 is inhibited from being driven as an electric motor. This suppresses the amount of electric power of the battery 15 consumed by the motor generator 2. In other words, if the affirmative determination is made in step S1 based on the fact that the battery 15 cannot be charged due to a failure of the motor generator 12, further reduction in electric power of the battery 15 can be prevented by step S4.

Then, the engine output is increased while the motor generator 2 is operated as a generator, thereby charging the battery 15 with the resultant electric power (step S5). Then, the routine returns to start. In step S5, the power generation amount of the motor generator 2 is controlled according to the sum of the required power generation amount based on the charging amount of the battery 15, and motor losses. The required power generation amount herein refers to the power generation amount for increasing the charging amount of the battery 15 to a value capable of starting the engine 1 by driving the motor generator 12 with the electric power.

The motor generator 2 has lower power generation efficiency than that of the motor generator 12 due to the difference in structure and characteristics. Since the power of the wheels 11 is transmitted to the motor generator 2 via the transmission 10, power losses are produced. For these reasons, the motor generators 2 and 12 are controlled differently even if the same required power generation amount is to be obtained. In the present embodiment, the motor losses corresponding to such a difference in power generation control are added. This enables the required charging amount to be reliably and efficiently ensured.

If NO in step S2, the ECU 16 determines whether the vehicle speed exceeds zero (step S6). If YES in step S6, that is, if in the motor-generator driving region, the clutch 8 is engaged, and the engine 1 is started with the power of the motor generator 2 (step S7). Then, the routine proceeds to step S3. Accordingly, the economic running system is inhibited from automatically stopping the engine 1.

More specifically, if the affirmative determination is made in step S1 based on the fact that the engine 1 cannot be started due to a failure of the motor generator 12, the engine 1 will be started with the power of the motor generator 2 when the control is switched from the motor-generator driving region to the engine driving region. However, if the motor generator 2 continues to be driven independently, the electric power of the battery 15 is reduced, thereby possibly making it impossible to start the engine 1 by the motor generator 2. Such a problem can be avoided by starting the engine 1 beforehand.

If NO in step S6, the ECU 16 determines, based on the accelerator opening, whether an acceleration request is present (step S8). If YES in step S8, the routine proceeds to step S7. The reason why the routine proceeds from step S8 to step S7 is the same as the reason why the routine proceeds from step S6 to step S7. If NO in step S8, the routine proceeds to step S3.

Figure 4:
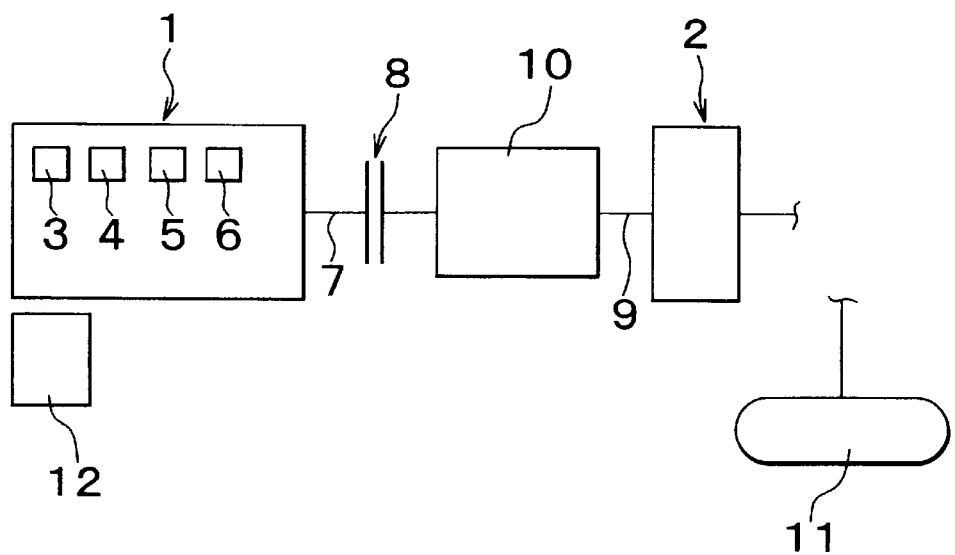
FIG. 4 is a diagram showing another layout of the power train in the hybrid vehicle to which the invention is applied.

FIG. 4 is a diagram showing another structure of the hybrid vehicle. In the embodiment of FIG. 4, the clutch 8 is provided between the crankshaft 7 of the engine and the input side of the transmission 10. The rotor of the motor generator 2 is connected to the output side of the transmission 10 via the power transmission shaft 9. The wheels 11 are connected to the power transmission shaft 9 on the side opposite to the transmission 10. In FIG. 4, the same control system as that of FIG. 2 can be used to control the motor generators 2, 12, engine 1, transmission 10 and clutch 8. The control example of FIG. 1 can also be applied to the embodiment of FIG. 4. Thus, it can be said that the present embodiment is a so-called failsafe control that inhibits the economic running system from automatically stopping the engine 1 when the startability of the engine 1 is degraded.

In the illustrated embodiment, the controller (the electronic control unit 16) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicle controller for controlling a vehicle having a plurality of driving power sources for transmitting torque to a wheel, the plurality of driving power sources including at least first and second driving power sources; and a starter for starting the first driving power source; wherein the controller:

stops the first driving power source when a prescribed stopping condition is satisfied, and starts the stopped first driving power source by the starter when a prescribed restarting condition is satisfied; and determines whether startability of the first driving power source by the starter has been degraded, and when the controller determines that the startability of the first driving power source has been degraded, the controller inhibits stopping of the first driving power source even when the prescribed stopping condition is satisfied.

2. The controller according to claim 1, wherein, when the controller determines, while the first driving power source is stopped, that the startability of the first driving power source by the starter has been degraded, the controller starts the first driving power source by transmitting power of the second driving power source to the first driving power source.

3. The controller according to claim 1, wherein the starter has a function to store electric power consumed to start the first driving power source and electric power consumed to drive the second driving power source, and when the controller determines that the startability of the first driving power source has been degraded due to decrease in an amount of electric power stored in the starter, the controller suppresses electric power consumption by the second driving power source.

4. The controller according to claim 3, wherein the second driving power source is a motor generator.

5. The controller according to claim 3, wherein, when an output torque of the first driving power source is insufficient with respect to required torque for the first driving power source, the controller drives the second driving power source to make up for the output torque, and when the controller determines the startability of the first driving power source has been degraded due to decrease in the amount of electric power stored in the starter, the controller inhibits driving of the second driving power source even when the output torque of the first driving power source is insufficient with respect to the required torque for the first driving power source.

6. The controller according to claim 1, wherein the starter has a function to store electric power consumed to start the first driving power source and the second driving power source has a function to generate electric power consumed to start the first driving power source, and when the controller determines that the startability of the first driving power source has been degraded due to decrease in an amount of electric power stored in the starter, the controller uses the power-generation function of the second driving power source to generate the electric power consumed to start the first driving power source.

7. The controller according to claim 6, wherein the controller has a function to control a power-generating state of the second driving power source based on the amount of electric power stored in the starter, consumed to start the first driving power source.

8. The controller according to claim 1, wherein the first driving power source is an engine.

9. The controller according to claim 1, wherein the starter includes a battery.

10. A vehicle control method for controlling a vehicle having a plurality of driving power sources for transmitting torque to a wheel, and a starter for starting a first driving power source of the plurality of diving power sources are provided, the first driving power source is stopped when a prescribed stopping condition is satisfied, and the stopped first driving power source is started by the starter when a prescribed restarting condition is satisfied, comprising the steps of:

determining whether startability of the first driving power source by the starter has been degraded; and inhibiting the stopping of the first driving power source, when the prescribed stopping condition is satisfied, when the startability of the first driving power source has been degraded.

11. The control method according to claim 10, wherein, when the first driving power source is stopped while the startability of the first driving power source by the starter has been degraded, the first driving power source is started by transmitting power of a second driving power source of the plurality of driving power sources to the first driving power source.

12. The control method according to claim 10, wherein the starter has a function to store electric power consumed to start the first driving power source and electric power consumed to drive a second driving power source of the plurality of driving power sources, and when the startability of the first driving power source has been degraded due to decrease in an amount of electric power stored in the starter, electric power consumption by the second driving power source is suppressed.

13. The control method according to claim 11, wherein the second driving power source is a motor generator.

14. The control method according to claim 12, wherein, when an output torque of the first driving power source is insufficient with respect to required torque for the first driving power source, the second driving power source is driven to make up for the output torque, and when the startability of the first driving power source has been degraded due to decrease in the amount of electric power stored in the starter, driving of the second driving power source is inhibited even when the output torque of the first driving power source is insufficient with respect to the required torque for the first driving power source.

15. The control method according to claim 10, wherein the starter has a function to store electric power consumed to start the first driving power source, the second driving power source has a function to generate electric power consumed to start the first driving power source, and when the startability of the first driving power source has been degraded due to decrease in an amount of electric power stored in the starter, the power-generation function of the second driving power source is used to generate the electric power consumed to start the first driving power source.

16. The control method according to claim 10, wherein the first driving power source is an engine.

17. The control method according to claim 10, wherein the starter includes a battery.

* * * * *